United States Patent [19]

Kastilahn et al.

[11] 4,164,696
[45] Aug. 14, 1979

[54] STEPPING MOTOR EXCITATION

[75] Inventors: William C. Kastilahn, Evanston; Leopold von Braun, Chicago, both of Ill.

[73] Assignee: Teletype Corporation, Skokie, Ill.

[21] Appl. No.: 823,309

[22] Filed: Aug. 10, 1977

[51] Int. Cl.² .................................................. H02K 37/00
[52] U.S. Cl. ........................................................ 318/696
[58] Field of Search ................. 318/696, 685, 254, 138

[56] References Cited

U.S. PATENT DOCUMENTS

| | | | |
|---|---|---|---|
| 3,486,096 | 12/1969 | Van Cleave | 318/696 |
| 3,662,245 | 5/1972 | Newell | 318/696 |
| 3,826,966 | 7/1974 | Nagasaka et al. | 318/696 |

Primary Examiner—Gene Z. Rubinson
Attorney, Agent, or Firm—W. K. Serp; J. C. Albrecht

[57] ABSTRACT

A variable reluctance motor wound for two-phase excitation is excited with single phase pulses, whereby the de-energization of one phase coil aids in the energization of the succeeding (and preceding) phase coil, in which a phase coil that is about to be de-energized is energized for a short period with maximum excitation energy power in order that the decay from that maximum power level, upon advance of the stepping motor, induces, by transformer action, an aiding voltage in the next succeeding phase coil so as to increase the speed of excitation of that next succeeding phase coil.

5 Claims, 3 Drawing Figures

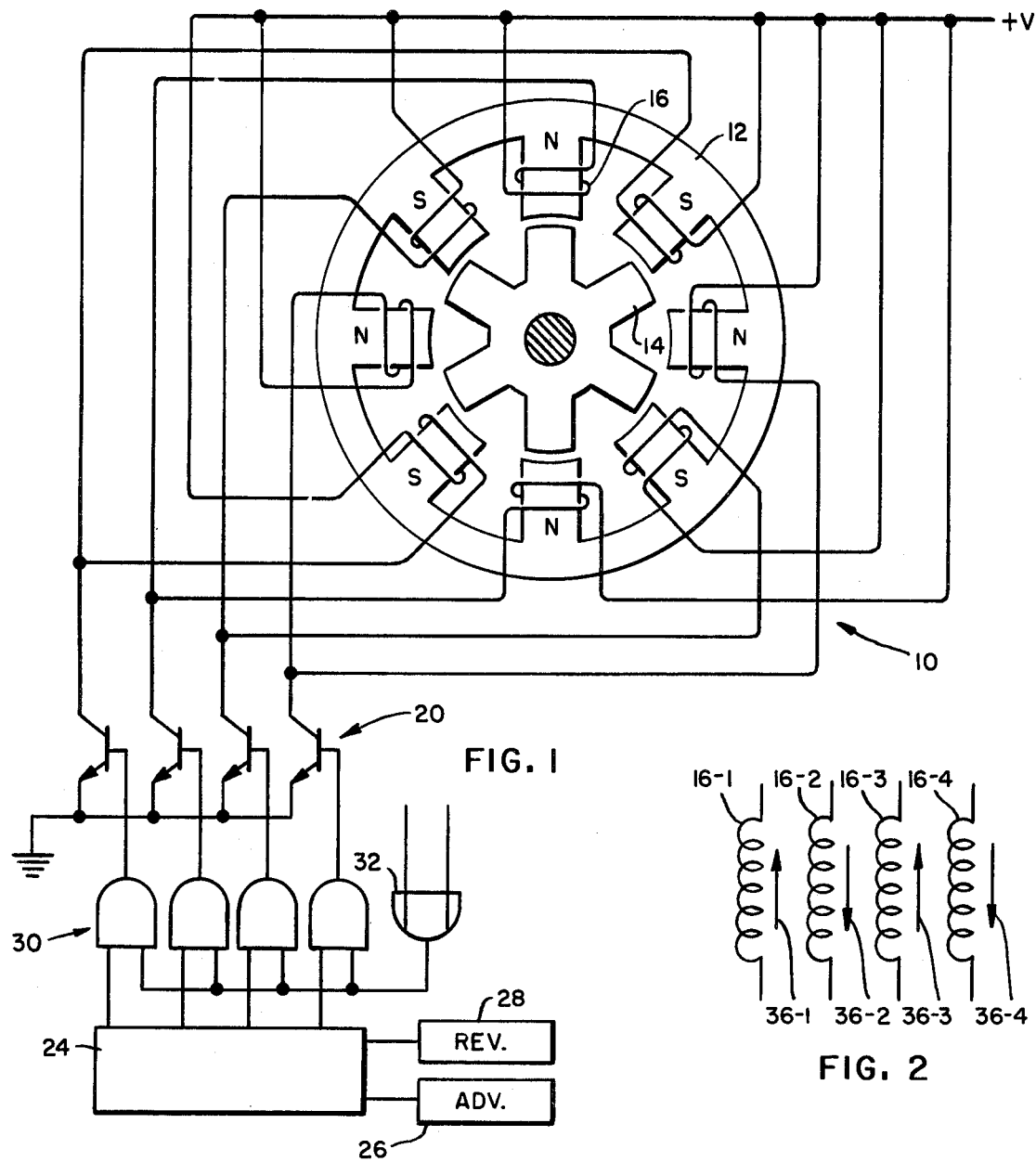
FIG. 1
FIG. 2
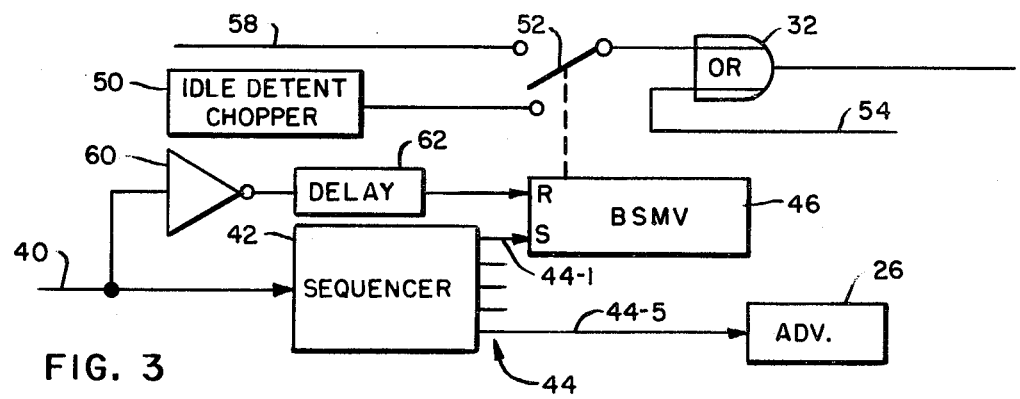
FIG. 3

STEPPING MOTOR EXCITATION

FIELD OF THE INVENTION

The present invention relates to stepping motors and more particularly to a system for increasing the speed of excitation of a stepping motor coil.

BACKGROUND OF THE INVENTION

In a wire-matrix page printer such as that disclosed in U.S. Pat. No. 3,982,633, granted on Sept. 28, 1976, to J. A. Bellino et. al., a carriage-advance stepping motor rotates a lead screw. The lead screw advances a wire-matrix printing carriage from left to right and vice versa across the width of a printing platen in order to print alpha numeric indicia on a sheet of paper. The carriage advance motor of the abovementioned Bellino et. al. patent can be idled in one location, accelerated from rest to a desired continuous speed, and run at that continuous speed to facilitate matrix printing on the paper.

The speed and power level of excitation of the stepping motor is preferably controlled by a power control circuit disclosed in U.S. Pat. No. 4,107,595, issued Aug. 15, 1978, in the name of W. T. Campe and in U.S. Pat. No. 4,107,594, issued Aug. 15, 1978, in the name of N. A. Jacobs. The responsiveness of the matrix printer is directly related to how fast the carriage can be started from rest and accelerated to its operating speed. Acceleration is a function of the power applied to the motor during startup. However, in order to use reasonable power supplies and reasonable operating components, a maximum power must be chosen which is a compromise.

Stepping motors wound for single phase excitation are arranged to energize diametrically-opposite poles of the stator with opposite magnetic polarity such that the flux path of the motor is from one pole, through the rotor, and to the pole on the diametrically-opposite side of the stepping motor. Flux return is through the body of the stator. This is a very efficient form of excitation, but the rotor has a greater tendency to ring or oscillate as it steps from one set of poles (or phase) to the next.

In a stepping motor wound for two-phase excitation, diametrically-opposite poles of the stator comprise a phase coil set and are wound to generate the same magnetic polarity. However, successive phase coil sets on adjacent poles of the stator are wound to produce opposite polarity. Consequently, when two adjacent poles (two successive phase coil sets) are energized in two-phase excitation, the nearest arm of the rotor tends to assume a position midway between the two excited poles. The flux path is not diametrically across the rotor but is in a shorter circuit from one pole face of the stator to the arm of the rotor and returning through the adjacent stator pole, and, of course, through the structure of the stator. Such two-phase excitation has a reputation for being somewhat higher in losses but is known to have a lower level of oscillation as the rotor is stepping from position to position by successive or stepped excitation of the motor.

SUMMARY OF THE INVENTION

In accordance with the present invention, a stepping motor is advanced by boosting the excitation power of a phase coil set of the stepping motor having inverse-polarity transformer coupling between successive phase coil sets and after a time related to a transient associated with the boosting of the excitation power, advancing the excitation power to a successive phase coil set of the stepping motor.

BRIEF DESCRIPTION OF THE DRAWING

The present invention will be more fully understood from the following detailed description when considered in conjunction with the accompanying drawing wherein like reference numbers designate the same or similar parts throughout several views in which:

FIG. 1 is a schematic diagram of a stepping motor wound for two phase excitation for operation in accordance with the present invention;

FIG. 2 is a schematic diagram of four phase windings of a two phase stepping motor showing the transformer coupling between them; and FIG. 3 is a schematic block diagram of a logic system for accomplishing the present invention.

DETAILED DESCRIPTION

Referring now to the accompanying drawing and more particularly to FIG. 1, a four phase stepping motor 10 is shown schematically and has a stator 12 comprising eight pole faces and a rotor 14 having six arms. Each pole of the stator 12 has a phase coil 16. The coils 16 of diagonally opposite poles of the stator 12 are interconnected in parallel (as shown) or alternatively in serial connection for simultaneous excitation and constitute a phase coil set. The opposite poles of the stator 12 are interconnected such that when energized, diagonally opposite poles of the stator apply the same magnetic pole (N or S) to the rotor 14. The four phase coil sets 16 are selectively energized by four sources of excitation power comprising transistorized power amplifiers 20 which include necessary inductive suppression circuitry (not shown).

The interconnected pattern of the phase coil sets 16 of the motor 10 as shown in FIG. is customarily used for two-phase excitation of the four phase variable-reluctance stepping motors. In two-phase excitation of a stepping motor, two adjacent pairs of phase coils are normally excited simultaneously. The opposite arms of the rotor position themselves midway between the two energized poles. Two-phase excitation requires that two of the four amplifiers 20 be energized simultaneously at any given instant of time. However, in the practice of the present invention it is preferred that only one pair of poles be energized at any given time and that only one of the four amplifiers 20 be in the ON condition at that instant.

U.S. Pat. No. 4,093,905, issued June 6, 1978, in the name of L. von Braun discloses basically single phase excitation of a stepping motor with a slight overlap in time between the excitation of successive phase pulses for advancing the stepping motor. While the system of the abovementioned von Braun patent may be used with the stepping motor, such possible use is disregarded herein in order to avoid confusion.

Accordingly, the four amplifiers 20 are preferably operated one at a time by a stepping switch or ring counter 24 in much the same way as is disclosed in the abovementioned patents of Campe and Jacobs. Only one of the four outputs of the ring counter 24 is energized in any given instant of time. The ring counter 24 is advanced by shifting signals applied to an advance circuit 26 or is stepping in the reverse direction by shifting signals applied to a reverse energizing circuit 28. Four AND-gates 30 are used with an OR-gate 32 selectively to chop or alternately to turn ON and OFF the output signals from the ring counter 24. Consequently, when the ring counter 24 energizes a given one of the amplifiers 20, the OR-gate 32 sends a chop signal to all four associated AND-gates 30 rapidly turns one of the energized amplifiers ON and OFF at a high frequency, in order to reduce the average power level supplied to the stepping motor 10. Thus each excitation power source 16 is setable to at least a first power level when not chopped and to a second power level when chopped.

The duty cycle or ON-time verses OFF-time of the chopped signal from the OR-gate 32 determines the average power level of the excitation signal supplied to the stepping motor 10. If it is desired that the rotor 14 supply a large amount of torque to accelerate the printing carriage of the stepping motor of the abovementioned Bellino et. al. patent, the duty cycle of the chop signal issuing from the OR-gate 32 is 100 percent. That is, the signal to one of the energized amplifiers 20 is not chopped at all. If, however, the ring counter 24 is not advancing but the rotor 14 of the stepping motor 10 is stationary, only a moderate amount of average power is required to retain the rotor 14 at the desired location. This approximates an electronic detent of the stepping motor 10. The chop signal from the OR-gate 32, under such a detenting and idle condition, can have a relatively low duty cycle, preferably less than 50%. This saves average power consumption and limits the heat generated within the stepping motor 10 and the amplifiers 20.

Alternatively, rather than chop the maximum-voltage excitation, a series resistor could be switched into operation to reduce power, or two supply voltages could be used, one for maximum power and one for a reduced power level.

MAGNETIC TRANSFORMER COUPLING

Any permeable structure surrounding electrical windings is likely to experience some transformer action coupling or linking the windings. FIG. 2 is a schematic diagram of the four winding pairs of the two-phase-connected stepping motor 10. The arrows in FIG. 2 illustrate the polarity of the coupling between the coils of the motors. For example, when current in the coil pair 16-2 increases in the direction of the arrow 36-2, a voltage is generated in each of the winding pairs 16-1 and 16-3 which induced voltage has a tendency to generate a current in the direction of the arrows 36-1 and 36-3.

Using the terms of differential calculus to explain the magnetic and inverse-polarity transformer coupling inherent in a variable reluctance motor wound for two phase excitation, when the change of current (di/dt) in coil pair 16-2 is polarized in accordance with the arrow 36-2, a voltage is generated in coil pair 16-3 so as to produce a current (i) in the coil pair 16-3 in the direction of the arrow 36-3. Speaking in terms of de-energization of a coil, assuming the normal energizing current, by convention, flows through any one of the four coil pairs 16 in the direction of the arrows 36-2 and 36-4, the de-energization of any coil pair 16 tends to produce a change of current that is negative (-di/dt) which is in the direction of the arrows 36-1 and 36-3. It can then be seen that the negative change of current (de-energization) in the coil pair 16-3 produces a voltage in both coil pairs 16-2 and 16-4 which tends to add algebraically to the applied voltage of energization or excitation which is presumed to be positive at the top of FIG. 2 and negative at the bottom of FIG. 2, by convention. Consequently, the de-energization of the coil 16-3 tends to aid the energization of the coil pairs 16-2 16-4. However, the coil pairs 16-2 and 16-4 are not energized simultaneously. Therefore, the aiding voltage only hastens current rise in the energized one of the coil pairs 16-2 and 16-4. The other coil pair has an OFF amplifier 30 and its aiding voltage has negligible effect.

APPLICATION OF MAGNETIC COUPLING TO STEPPING MOTOR EXCITATION

As demonstrated above in connection with FIG. 2, the de-energization of one coil set tends to generate a voltage in the adjacent or successive coil set which is algebraically additive to the applied voltage of the excitation circuit of the stepping motor. When maximum torque is required to start the rotor 14 from rest, it is desired that the excitation of the succeeding phase winding should proceed as rapidly as possible. Therefore, it would be desirable to use as high a supply voltage as possible in order to increase the current in the succeeding phase coil or winding as rapidly as possible in order to promote maximum torque and maximum speed response of the stepping motor 10. However, as mentioned above, choice of supply voltage is a compromise. However, the additive effect of the de-energization of the previous phase winding of the stepping motor 10 can be exploited to hasten the energization of the succeeding phase winding. This is done by terminating the idle or detent chopping of the excitation signal delivered to the stepping motor via the chop signal from the OR-gate 32 immediately prior to an advance signal for starting the stepping motor 10. If the chop signal from the OR-gate 32 is terminated a few milliseconds before the advance of the ring counter 24, the level of excitation current in the previously-energized phase winding will rise from the lower average level of excitation power represented by the chop detent or idle signals to the maximum signal obtainable from the supply voltage, thereby boosting the excitation power supplied to the energized phase coil set. As soon as the maximum or nearly the maximum excitation level has been achieved, after a time related to the transient change in power level, the ring counter 24 is advanced to turn OFF the previously-energized coil or winding pair and turn ON the next succeeding phase or winding pair of the stepping motor 10. In this way, the previously energized winding pair experiences a maximum negative di/dt which generates a maximum transformercoupled voltage in the succeeding phase winding pair in order to algebraically add to the supply voltage so as to shorten the rise time of the current pulse in that succeeding phase winding coil pair.

It will be evident to one skilled in the art that if a series resistor is used to achieve the lower level of excitation, the series resistor can be bypassed in order to revert to maximum excitation before stepping the motor. Similarly, if two different power supplies are used, excitation by the higher-voltage (to produce higher current in the motor coils) power supply can be used before stepping the motor in order to maximize current in the previously-energized phase coil before stepping the motor.

CIRCUIT

Referring now to FIG. 3 of the accompanying drawing, a simplified, exemplary block diagram of a circuit is shown for changing a low average power level idle excitation to a maximum idle excitation prior to a step advance of the stepping motor 10. A. U.S. Pat. No. 4,132,979 issued Jan. 2, 1979, in the name of Richard H. Heeren discloses a logic system for controlling among other functions, the carriage starting and advance of a stepping motor for a matrix printer such as that disclosed in the abovementioned Bellino et. al. patent.

The logic circuit of the abovementioned Heeren application includes a buffer for storing incoming alphanumeric character code combination signals until they can be processed and printed by the circuit and the printer of the abovementioned Bellino et. al. patent. Such an incoming buffer is generally an asynchronous register which typically has some internal indication that there is a character-represented code combination in the buffer ready to be printed. This character-available signal at the output of the buffer or at any other appropriate point in the logic system of the abovementioned Heeren patents is used to present a character-available signal on the character-available wire 40, of FIG. 3. The character-available signal on the wire 40 starts a sequencer 42 which might be either a stepping switch or a ring counter or even a programmable logic array as disclosed in the abovementioned Heeren patent, for generating a sequence of timing pulses in a timed relation on a plurality of outputs 44. One of the outputs 44-1 is used to set a start bistable multivibrator 46 to its set or binary "1" condition. At some predetermined time later in the arbitrary operation of the sequencer 42, a signal on the output 44-5 is sent to the advance circuitry 26 to advance the ring counter 24 so as to cause the stepping motor 10 to advance by one step. However, the sequenced time signals on the outputs 44-1 and 44-5 are separated in time by a time interval calculated to allow the excitation of the stepping motor to progress from the reduced average excitation level corresponding with the idle or detent state of the stepping motor 10, up to the maximum excitation level possible with the supply voltage V (FIG. 1). The circuit of FIG. 3 includes an idle detent chopper 50. This idle detent chopper circuit generates a chopped signal having a duty cycle representative of the reduced average level of excitation desired in the stepping motor 10 during the idle or detenting condition in which the rotor 14 is stationary. Preferably with the stepping motor 10, the idle detent chopper produces an ON interval of approximately 11 units of time and a suitable OFF interval to produce a total cycle interval of 28 units of time. Such a chop signal issuing from the idle detent chopper 50 represents a duty cycle of approximately 40%. Consequently, the idle or detenting power that is supplied to the stepping motor 10 is approximately 40% of the maximum power that can be supplied to the stepping motor. When no characters are available to be printed and the stepping motor 10 is in its idle condition, the bistable multivibrator 46 controls a transfer switch 52 to connect the idle detent chopper 50 to the OR-gate 32 for controlling the chopping of the amplifiers 20. While a transfer contact 52 is shown, it will be understood that the transfer contact 52 is preferably of an electronic variety. The other input 54 of the OR-gate 32 is preferably from a start sequencing control circuit as shown in either of the abovementioned Campe or Jacobs United States Patents.

When a character-available signal is sent on the character-available wire 40, the sequencer 42 is started and energizes the output wire 44-1 to set the bistable multivibrator 46 to its binary "1" condition which transfers the transfer contact 52 from the idle detent chopper 50 to a chop wire 58. The chop wire 58 is the normal power control circuit for the stepping motor 10, as fully disclosed in the abovementioned patents of Campe and Jacobs. However, for purposes of the present description it is sufficient that the wire 58 is continuously energized without any chop signal. This is the case in the abovementioned Campe and Jacobs patents when the stepping motor 10 is stationary. Consequently, as soon as the sequencer 42 begins operation by setting the bistable multivibrator 46 to the binary "1" condition, the OR-gate 32 ceases to send chop signals to the AND-gates 30 but instead sends a continuous "ON" signal to the AND-gates 30 to terminate the chopping and to allow the excitation of the "ON" winding of the stepping motor 10 to increase to the maximum possible with excitation at the voltage V. Only after the time determined by the sequencer 42 is the output 44-5 energized to cause the advance circuitry 26 to advance the ring counter 24 so as to de-energize the "ON" winding pair 16 and turn "ON" a new or succeeding winding pair 16 so as to advance the stepping motor 10 by one step.

When no characters are available for printing in the printer with which the stepping motor 10 is used, the character-available signal is removed from the character-available wire 40 and an inverter 60 sends an inverse character-available signal through a delay 62 to reset the bistable multivibrator 46 to its "0" condition so as to control the transfer switch 52 to interconnect the output of the idle chopper 50 to the input of the OR-gate 32.

While various specific embodiments and examples of the invention have been described in detail above, it will be obvious that various modifications may be made from the specific details described, without departing from the spirit and scope of the invention.

What is claimed is:

1. A method for advancing a stepping motor having a rotor and having a stator wound for two-phase excitation and for inverse-polarity transformer coupling between successive poles and having a circuit for exciting the stepping motor with single-phase signals having a first power level and for exciting the stepping motor with single-phase signals having a second power level, substantially less than the first power level, comprising the steps of:

(1) exciting the stepping motor with the second power level signals;

(2) exciting the stepping motor with the first power level signals immediately prior to advancing the excitation of the stepping motor from one pole to a successive pole; and (3) after a time commensurate with the time of transition from the second power level to the first power level advancing the stepping motor excitation from the one pole to the successive pole, thereby rotating the rotor.

2. A method according to claim 1 in which the second power level is achieved by chopping the excitation signals of the first power level; and wherein the first power level is achieved by terminating the chopping prior to advancing the stepping motor.

3. A circuit for applying control signals to a stepping motor having n coil sets and a rotor that moves in response to shifting signals for advancing excitation from one coil set to a successive coil set, said coil sets being wound for inverse-polarity transformer coupling between the one coil set and the successive coil set, comprising:
  n sources of excitation power, one source associated with each coil set;
  means for selecting and energizing at least one power source at a time for exciting its associated coil set;
  the power sources settable to first and second power levels, the second power level being substantially less than the first power level; and
  control means for setting an energized power source from the second power level to the first power level in response to a shifting signal, and for delaying the selecting of another power source associated with a successive coil set until the excitation level of the excited coil set can reach substantially the first power level.

4. A circuit according to claim 3 wherein the sources are set to the second power level by means for generating a chopping signal and means for introducing the chopping signal to the sources of excitation power.

5. A circuit according to claim 4 wherein the control means comprises means for removing the chopping signal from the sources of power in response to a shifting signal.

* * * * *